UNITED STATES PATENT OFFICE.

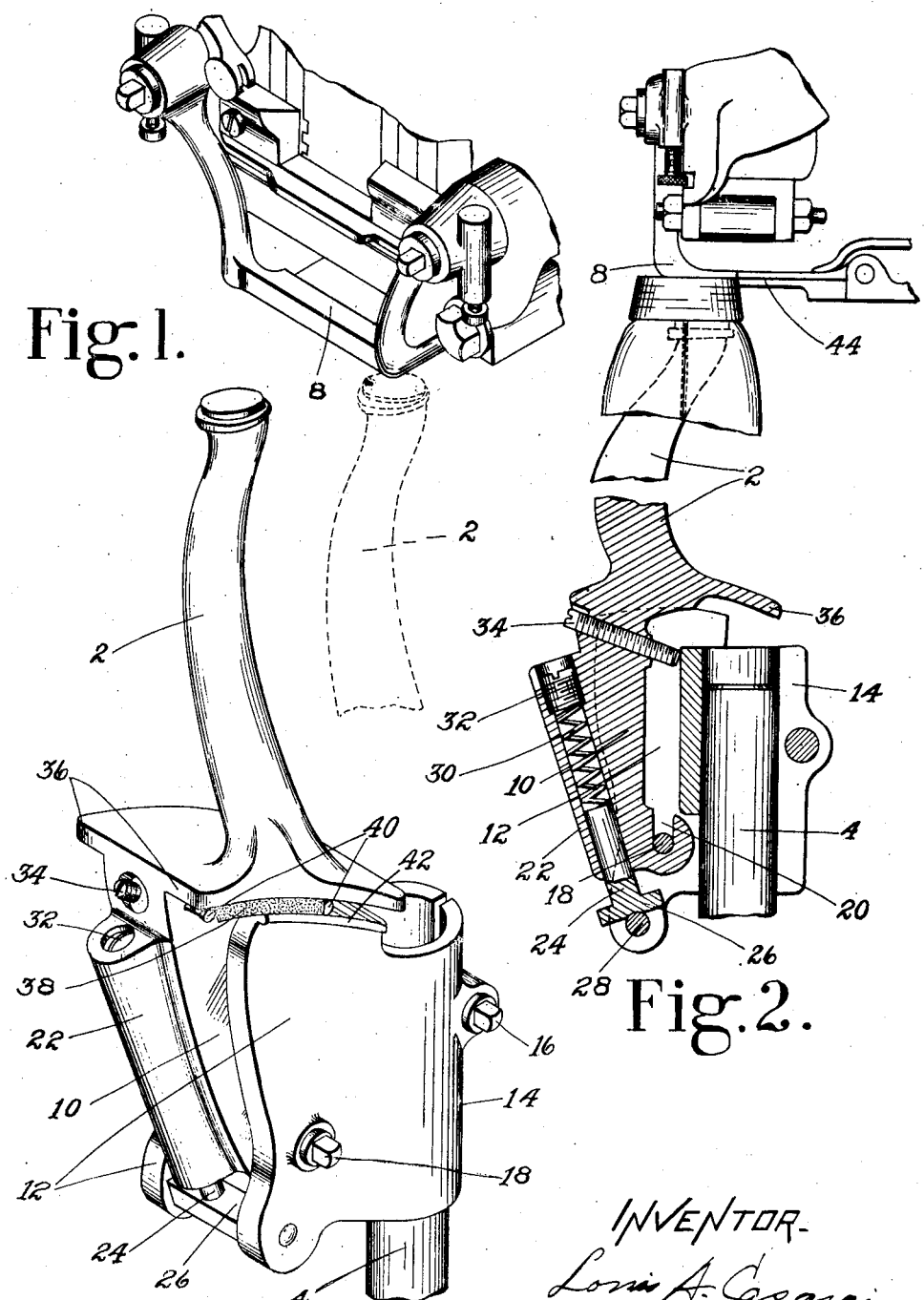

LOUIS A. CASGRAIN, OF BEVERLY, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

WORK-SUPPORT.

1,344,290.

Specification of Letters Patent.

Patented June 22, 1920.

Application filed February 9, 1916. Serial No. 77,245.

*To all whom it may concern:*

Be it known that I, LOUIS A. CASGRAIN, a citizen of the United States, residing at Beverly, in the county of Essex and State of Massachusetts, have invented certain Improvements in Work-Supports, of which the following description, in connection with the accompanying drawings, is a specification, like reference characters on the drawings indicating like parts in the several figures.

This invention relates to work supports and is herein shown and described by way of illustration as applied to a machine for inserting fastenings in boots and shoes.

Among the objects of the invention are to provide an improved work support constructed and arranged to facilitate removal of work from, or replacement of work upon, the work support and to insure proper presentation of the work to the machine and proper support of the work during the operation of the machine.

In accordance with these objects of the invention the horn of the work support herein shown and described as illustrating a preferred embodiment of the invention is constructed and arranged for yielding lateral movement out of line with the operating mechanisms of the machine for convenience in placing work upon and removing it from the horn. When the horn is moved into work presenting position it adjusts itself laterally with respect to the path of feed of the work according to the particular requirements of the work and it is then locked automatically in adjusted shoe presenting position for a fastening inserting operation. Also, to permit the horn to position itself according to variations in thickness of different portions of a piece of work between the top of the horn and the edge gage, the horn, which is normally maintained in a predetermined position relatively to the edge gage of the machine, is laterally self adjusting automatically into different operative positions during the operation of the machine, thus preventing the work from being wedged between the gage and the horn and being damaged thereby as frequently occurs in work supports of the type heretofore employed.

Other objects and features of the invention will be apparent from a consideration of the following description read in connection with the accompanying drawings in which a preferred embodiment of the invention is illustrated.

Figure 1 is a perspective view of the work support showing the relative positions of the work support and the other parts of the machine; and Fig. 2 is a view showing the lower portion of the work support in vertical section and the upper portion of the work support with the work thereon and in operative relation to the machine.

The illustrated work support may be embodied in various kinds of machines for use in the manufacture of boots and shoes, including fastening inserting machines of any of the types in use, for example, the machine shown in United States Patent No. 1,053,479 granted Feb. 18, 1913, on an application of Louis A. Casgrain.

The work support shown in said patent comprises a horn 2 mounted upon the upper end of a horn spindle 4 which is adapted to slide vertically in a tubular neck on the machine frame. The horn spindle 4 is connected to mechanism which causes the horn to clamp the work against the work abutment on the head 8 of the machine and effects a periodic release of the horn clamping pressure to permit the work to be fed between the insertion of successive fastenings.

In accordance with this invention, the horn 2 upon which the work to be operated on is supported is provided with a shank portion 10 which is confined for rocking movement between parallel ears 12 projecting forwardly from a split sleeve 14 which constitutes a carrier for the horn or other work support and which may be secured in adjusted position on the upper end of the horn spindle 4 by a set nut 16.

The lateral rocking movement of the horn on the carrier or sleeve 14 takes place about a pivot rod 18 offset from the horn spindle 4 and the axis of the carrier and extending across the opening between the ears 12. The pivot rod 18 is received in an open ended vertical slot 20 provided in the lower end of the shank 10 of the horn, connections being thus formed between the horn and the carrier 14 which permit both bodily and angular movement of the horn relatively to the carrier. An inclined hollow boss 22 is formed on the front of the shank portion of the horn and located therein is a spring pressed plunger 24. The outer end of this plunger terminates in a transversely extending bar 26 which engages a rod 28 that is supported at either end by the ears 12 and is located below and to the side of the pivot rod 18 remote from the axis of the carrier. The plunger is pressed downwardly against the rod 28 by a spring 30 which resists bodily movement of the horn and exerts sufficient pressure against the rod to support the horn and to maintain its pivot 18 normally in the bottom of the slot 20, the force of the spring being regulated by an adjusting screw 32. From the foregoing, it will be understood that the pivot rod 18 by engagement with the bottom of the slot 20 limits the movement of the horn 2 under the action of the spring 30. By reason of the fact that the rod 28 which supports the horn on the sleeve is offset from the vertical plane in which the pivot rod 18 of the horn lies in a direction away from the axis of the carrier, the spring pressed plunger also acts to resist angular movement of the horn about the pivot rod 18 and to maintain the horn normally in a predetermined or vertical position and such position is preferably controlled by an adjusting screw 34 threaded through the horn 2 and engaging the sleeve 14.

Means is provided for locking the horn in its canted position on the horn spindle during the insertion of fastenings. The illustrated means comprises two flanges 36 rigidly connected to the horn 2 and projecting outwardly from the base of the horn so as to overlie the upper edges of the ears 12 which are rigidly mounted on the carrier or sleeve 14. Strips of leather 38 are preferably secured to the under sides of the flanges 36 by pins 40 and the upper edges of the ears are provided with corrugations 42 so as to insure frictional engagement between the horn and the sleeve when pressure is exerted longitudinally of the horn.

In the use of the work support above described, the horn 2 is rocked laterally from under the head of the machine and the shoe applied. The shoe is then moved in against the edge gage 44 which positions the shoe relatively to the inserting mechanism, the shoe being yieldingly held in this position by the action of the horn under the influence of the spring 30, which normally supports the horn 2 in a position such that the flanges 36 of the horn are spaced from the upper edges of the ears 12.

Upon the operation of the machine or upon the upward movement of the carrier or sleeve 14 following the feeding of the work, the clamping pressure exerted longitudinally of the horn overcomes the power of the spring 30 and forces the horn 2 downwardly relatively to the sleeve until the flanges 36 seat themselves upon the upper edges of the ears thereby automatically locking the horn against lateral movement during the fastening inserting operation and causing the horn to be supported positively by the ears 12. When the clamping pressure of the horn is relieved to permit the work to be fed the spring 30 automatically releases the horn 2 from frictional locking engagement with the sleeve 14 and thus allows the horn to adapt itself to the particular requirements of the shoe being operated upon.

Having thus described my invention, what I claim as new and desire to secure by Letters Patent of the United States is:—

1. In a machine of the class described, a horn spindle, a horn mounted thereon for lateral operative adjustment with respect to the path of feed of the work, and means constructed and arranged to be rendered operable automatically to lock the horn in different adjusted positions on the horn spindle.

2. In a machine of the class described, a horn spindle, a horn mounted thereon for lateral operative adjustment with respect to the path of feed of the work, means for locking the horn in any one of a plurality of adjusted positions on the horn spindle, and means for automatically releasing the horn from the operation of said locking means.

3. In a machine of the class described, in combination, a horn spindle, a horn mounted thereon for yielding lateral movement with respect to the path of feed of the work, and means for locking the horn against lateral movement from its assumed position on the horn spindle when pressure is exerted substantially longitudinally of the horn.

4. In a machine of the class described, a horn spindle, a horn mounted thereon for lateral operative adjustment with respect to the path of feeding movement of the work, means acting to maintain the horn normally in a predetermined position relatively to the machine and tending to restore the horn to such position when displaced therefrom, and means to lock the horn in any of its adjusted positions on the horn spindle.

5. In a machine of the class described, in combination, a horn spindle, a sleeve mounted on the horn spindle, a horn mounted on the sleeve for lateral movement with respect to the path of feed of the work and for movement longitudinally of the horn, and means for maintaining the horn normally against lateral movement constructed and arranged to maintain it against longitudinal movement.

6. In a machine of the class described, a work support comprising a horn spindle, a horn mounted on said spindle for lateral operative adjustment with respect to the path of feed of the work and for movement longitudinally of the spindle, and means rendered operative by the longitudinal movement of the horn relatively to the spindle to lock said horn against lateral movement away from its adjusted position.

7. In a machine of the class described, in combination, a horn spindle, a horn carried by said spindle and connections between the horn spindle and the horn constructed and arranged to effect operative lateral adjustments of the horn on the horn spindle with respect to the path of feed of the work and to lock the horn in any of its lateral adjustments when pressure is applied to the horn substantially longitudinally of its axis.

8. In a machine of the class described, in combination, a horn spindle, a horn mounted on said spindle for lateral operative adjustment between a work receiving and a normal work presenting position of the horn, and means associated with said horn and said spindle constructed and arranged to lock the horn relatively to the spindle in any of the lateral adjustments assumed by the horn between its work receiving and its normal work supporting position.

9. In a machine of the class described, in combination, a horn spindle, a horn carried by said spindle, connections between the horn spindle and the horn constructed and arranged to allow the horn to be adjusted laterally to different operative positions, and means rendered operable automatically to lock the horn in different adjusted positions on the horn spindle.

10. In a machine of the class described, in combination, a horn spindle, a sleeve adjustably mounted on the spindle, a horn mounted on the sleeve for lateral operative adjustments relatively to the path of the feed of the work, spring means for maintaining the horn normally in a predetermined relation to said sleeve, and means for automatically locking the horn in any of its operative adjustments on the horn spindle.

11. In a machine of the class described, in combination, a horn spindle, an adjustable sleeve carried on the spindle and having parallelly extending ears, a horn the shank portion of which is located between said ears and has a pin and slot connection with the ears, a spring pressed plunger carried by said ears constructed and arranged yieldingly to support the horn on the sleeve and to maintain the horn in normally predetermined position relatively to said sleeve while allowing the horn to be adjusted laterally with respect to the path of the feed of the work, and means on the horn adapted to coöperate with said ears for locking the horn in adjusted position on the horn spindle.

12. In a machine of the class described, a work support, a carrier for said work support adapted to be periodically lowered to permit feeding of the work, said work support being movably mounted on said carrier, and means on the work support and carrier constructed and arranged to lock the work support to the carrier upon upward movement of the carrier from work feeding position, said means comprising a locking member rigidly mounted on the carrier.

13. In a machine of the class described, a work support, a carrier for said work support adapted to be periodically lowered to permit feeding of the work, said work support being movably mounted on said carrier, and means on the work support and carrier constructed and arranged to lock the work support to the carrier upon upward movement of the carrier from work feeding position, said means comprising locking members rigidly mounted on the work support and carrier respectively and adapted to engage each other frictionally upon upward movement of the carrier.

14. In a machine of the class described, a horn, a carrier for said horn adapted to be periodically lowered to permit feeding of the work, means on the carrier constructed and arranged to support the horn positively, and means acting normally to space the horn from said supporting means.

15. In a machine of the class described, a horn, a carrier for said horn adapted to be periodically lowered to permit feeding of the work, means on the carrier for rigidly supporting said horn and means on the carrier for yieldingly supporting said horn in spaced relation to said first-named supporting means.

16. In a machine of the class described, a horn, a carrier for said horn adapted to be periodically lowered to permit feeding of the work, means on the carrier for rigidly supporting said horn, means on the carrier for yieldingly supporting said horn in spaced relation to said first-named supporting means, and means for limiting the movement of said horn under the action of said yieldingly operating means.

17. In a machine of the class described, a horn, a carrier for said horn, connections between said horn and carrier, coöperating members on the horn and carrier operable to support the horn from said carrier, and means for normally maintaining the horn in position with said members spaced from each other, said means and said connections being constructed and arranged to permit relative movement of the horn and carrier in one direction to bring said members into operative relation to each other and to permit movement of the horn relatively to said carrier in a direction angular to the direction of said first-mentioned movement.

18. In a machine of the class described, a spindle, a work support, a carrier for said work support fixedly secured to said spindle, and yielding connections between said work support and carrier constructed and arranged to urge the work support upwardly and to permit bodily movement of the work support relatively to the carrier, said connections tending to move the work support angularly relatively to the carrier.

19. In a machine of the class described, a horn, a carrier for said horn, connections between said horn and carrier permitting bodily movement of the horn relatively to the carrier, means tending to move the horn angularly relatively to the carrier, and means for locking the horn to the carrier controlled by the bodily movement of the horn relatively to the carrier.

20. In a machine of the class described, a spindle, a work support, a carrier for said work support mounted on said spindle, connections between the carrier and the work support permitting both bodily movement and angular movement of the work support relatively to the carrier, and a spring acting to resist either bodily or angular movement of the work support.

21. In a machine of the class described, a work support, a carrier for said work support, means for pivoting the work support to said carrier at a point offset from the axis of the carrier, and means tending in all positions of the work support to move said work support about said pivot toward said carrier.

22. In a machine of the class described, a work support, a carrier for said work support, means for pivoting the work support to said carrier at a point offset from the axis of the carrier, and means tending to move said work support about said pivot toward said carrier, said means comprising a spring operating contactually on said work support at a point more remote than said pivot from the axis of the carrier and said work support and spring being constructed and arranged to permit substantial movement of the work support so as to enable it to accommodate itself to variations in the character of the work.

23. In a machine of the class described, a horn, a carrier for said horn adapted to be periodically lowered to permit feeding of the work, connections between the horn and carrier permitting movement of the horn laterally of the path of movement of the carrier, and means controlled by the movement of the carrier for locking the horn against lateral movement relatively to the carrier.

In testimony whereof I have signed my name to this specification.

LOUIS A. CASGRAIN.